United States Patent [19]
Ertle et al.

[11] Patent Number: 5,501,826
[45] Date of Patent: * Mar. 26, 1996

[54] PROCESS FOR MANUFACTURING LIGHTWEIGHT INORGANIC PARTICLES

[75] Inventors: Raymond T. Ertle; Raymond J. Ertle, both of Pompton Plains, N.J.

[73] Assignee: Cylatec Corp., Pompton Plains, N.J.

[ * ] Notice: The portion of the term of this patent subsequent to Sep. 21, 2010, has been disclaimed.

[21] Appl. No.: 123,431

[22] Filed: Sep. 17, 1993

Related U.S. Application Data

[63] Continuation-in-part of Ser. No. 783,898, Oct. 29, 1991, Pat. No. 5,246,654.

[51] Int. Cl.$^6$ .................................................. B29B 9/02
[52] U.S. Cl. ........................ 264/118; 264/140; 264/141; 264/42
[58] Field of Search ................................. 264/118, 140, 264/141, 42; 106/601, 600

[56] References Cited

U.S. PATENT DOCUMENTS

| | | |
|---|---|---|
| 2,039,008 | 4/1936 | Kliefoth . |
| 2,117,605 | 5/1938 | Fowler et al. . |
| 3,728,208 | 4/1973 | Whittington et al. .................. 428/405 |
| 3,756,839 | 9/1973 | Rao ......................................... 106/604 |
| 3,765,919 | 10/1973 | Gelbman ................................ 106/409 |
| 3,951,834 | 4/1976 | Gillilan ................................... 106/601 |
| 4,203,773 | 5/1980 | Temple et al. ............................ 501/85 |

*Primary Examiner*—Mary Lynn Theisen
*Attorney, Agent, or Firm*—Klauber & Jackson

[57] ABSTRACT

A method is provided for producing dense, free-flowing and non-caking alkali metal silicate-based particles which are heat expandable into lightweight particles of a spumiform character. Pursuant to the invention, one provides at a selected temperature a dilatant aqueous gel comprising an alkali metal silicate as the majority non-aqueous component, the silicate being present in the gel in a dissolved state; and the non-aqueous content of the gel being in the range of from about 38 to 65% (w/w). Shearing forces are imposed upon the gel which exceed the flow response characteristics of the gel, whereby the viscosity of the gel becomes sufficiently high to cause a discontinuity in the gel, resulting in disruption into discrete particles. The discrete particles are conditioned while being maintained as separate entities to thereby form a skin on the particles so that they will not agglomerate or coalesce with one another. The conditioned particles are dried to form particles having about a 5 to 40% (w/w) moisture level.

8 Claims, 3 Drawing Sheets

PROCESS FOR MANUFACTURING LIGHTWEIGHT INORGANIC PARTICLES

RELATED APPLICATION

This application is a continuation-in-part of our application, Ser. No. 07/783,898, filed Oct. 29, 1991 now U.S. Pat. No. 5,246,654.

This invention is the subject of a related Disclosure Document, filed at the United States Patent and Trademark Office on Apr. 12, 1993 under Ser. No. 333,166. This document is hereby incorporated by reference.

FIELD OF INVENTION

The invention described herein relates to free-flowing alkali metal silicate intermediate particles and to methods of preparation and use. These intermediate particles or pellets are heat expandable to form spumiform particles which have a volume of at least about five times the volume of the intermediates, and which are useful as fillers, insulators and the like.

BACKGROUND OF THE INVENTION

The processes of making silicate-based particles of the prior art usually entail the mixing of liquid silicates with various compounds as further described below, heating said mixture to drive off enough water to form a hard glassy material, and subsequently grinding and screening the material into particles of suitable size. Additionally, dry silicates have been employed along with water to form the necessary hydrated silicates. Silicate-based materials have not found general broad acceptance for the end uses described herein. This is likely due to the difficulties encountered in producing a suitably dense intermediate of a formulation which has a high expansion rate, is homogeneous, non-caking, easy to handle and easy to produce. The production methods of prior art involve drying the initial mixtures to a point where they can be ground to suitable particles. This normally involves drying the initial mass for long periods of time (from 1 to 4 hours). Such long drying times are felt necessary due to the fact that the silicates in an aqueous media form a skin on their surface during drying which tends to impede further drying to an acceptable moisture range. Attempts to overcome this problem have resulted in some cases in the addition of silicates in the dry form to lower the amount of moisture which must be removed before grinding. The use of these dry silicates, however, necessitates additional waiting periods of up to four hours to allow the dry silicates to hydrate to an expandable form, or requires the use of pressures greater than atmospheric. Additionally, when employing dry silicates as a starting point, other ingredients such as fillers, insolubilizers, etc. are mixed or mulled with the silicate, and remain as discrete particles in the final dense phase, creating less homogeneous mixtures than can be produced by the use of silicate solutions, where optimum dispersions or solutions are possible. All of these methods have serious drawbacks which impede the commercial production of these materials and tend to result in high manufacturing costs.

A number of issued patents can be noted which are of interest. U.S. Pat. No. 3,756,839 relates to the preparation of silicate-based materials which may be intumesced through the use of anhydrous silicates and insoluble powders and water by hydrating said mixture by subsequent application of heat and pressure (or steam under pressure) and subsequently compacting said hydrated mixture. Compacting may be accomplished with the heat and pressure of the hydrating step or by means of a separate press or extruder. This process utilizes raw materials in a finely divided form, and the levels of insoluble powders included are limited by the non-homogeneous nature of the process.

U.S. Pat. No. 4,203,773 relates to the preparation of expanded silicate aggregates also through the use of anhydrous silicates. Anhydrous silicate, a curing agent and an optional insolubilizer are dry mixed; water is added and the mixture is caused to hydrate at temperatures of 80°–90° C. at a humidity level of 90% or higher. This hydration step takes a matter of hours to complete, and the hydrated mass must subsequently be pulverized to the required size before intumescing.

U.S. Pat. No. 3,728,208 relates to intumesced silicate compounds formed through the use of anhydrous and liquid silicates, along with other ingredients which form spumiform particles having a volume of about 3 to 4 times the volume of the extruded pellets.

U.S. Pat. No. 3,765,919 relates to the manufacture of lightweight silicate-based materials through the use of liquid and anhydrous silicates, an expansion controller and a heat triggered neutralizer. The ingredients are blended and subsequently passed into an oven to dissolve the anhydrous silicate and to cause drying of the mixture. The mixture is then cooled and crushed into suitable size particles. The crushing operation produces undesirable dust, and the retention time required in the oven is between one and four hours. Long retention times along these lines require massive increases in the size or length of plant equipment and tend to severely limit production capacity.

U.S. Pat. No. 2,039,008 relates to the use of liquid silicates along with clays. The initial mixture is extruded into short cylinders and the cylinders are covered with talc to prevent them from sticking to each other. The coated cylinders are then heated to cause the silicate to puff. The addition of another compound (talc) added in a non-homogeneous fashion (as an outside coating) is undesirable, and no attempt is made to produce dense, easily handled, non-caking intermediate particles for expansion at a later time.

U.S. Pat. No. 2,117,605 relates to liquid silicates used along with other compounds to produce materials with a spumiform structure. After mixing and heating the ingredients, the resultant liquid is poured into shallow pans or onto a moving belt in an oven and dried until a hydrous crushable solid is obtained upon cooling. The material is then crushed to the desired size and this requires a grinding and sizing operation, with the undesirable production of dust.

It is accordingly an object of the present invention to produce dense, free-flowing, non-caking, easily handled particles which can be transported in their intermediate state to a remote location and, at the job site, treated to form the desired end product.

It is a further object of the present invention to produce relatively dense intermediate particles which expand or intumesce when rapidly heated at about 250°–1100° F. into rigid particles of a spumiform nature, with particle volumes which are at least about five times the volume of the original particles.

It is another object of the present invention to produce dense intermediate particles without the need for long drying times, grinding, and/or the use of pressures greater than about atmospheric pressure. A still further object of the invention is to provide novel lightweight particles for use as fillers, insulators or the like, which particles possess an internal spumiform structure, and have shape and surface characteristics facilitating their bulk flow properties and their incorporation into mixed component systems.

SUMMARY OF THE INVENTION

Now in accordance with the present invention, a method is provided for producing dense, free-flowing and non-caking alkali metal silicate-based particles which are heat expandable into lightweight particles of a spumiform character. Pursuant to the invention, one provides at a selected temperature a dilatant aqueous gel comprising an alkali metal silicate as the majority non-aqueous component, said silicate being present in the gel in a dissolved state; and the non-aqueous content of the gel being in the range of from about 38 to 65% (w/w). Shearing forces are imposed upon the gel which exceed the flow response characteristics of the gel, whereby the viscosity of the gel becomes sufficiently high to cause a discontinuity in the gel, resulting in disruption into discrete particles. The discrete particles are surface conditioned while maintained as separate entities to form a skin on the particles so that they will not agglomerate or coalesce with one another. The conditioned particles are dried to form particles having about a 5 to 40% (w/w) moisture level.

The conditioning of the discrete particles resulting from shearing is typically carried out in an airstream. The airstream temperature can typically be in the range of about 100° to 210° F., and the time of conditioning exposure being at least one second.

The shearing forces can be applied in a variety of ways, as for example by advancing a mass of the gel into the path of a plurality of rapidly moving flailing or other wires, or by rapidly squeezing the gel by passage through narrowly spaced counter-rotating rollers. Similarly the shearing forces can be generated by impacting the gel against a hard surface. The method described in my Ser. No. 783,898 application can also be used, wherein the dilatant gel is extruded and the advancing extrusions impacted, disrupted or cut by means which provide the shearing forces. These means can take the form of cutting blades, wires or the like. The conditioned and dried particles can be comminuted to reduce the particle size.

The foregoing process results in an intermediate which is a free-flowing alkali metal silicate-based particulate material in which said silicate is the majority non-aqueous component and is present as an amorphous phase. The particles of the particulate have a moisture content of about 5 to 40%, and are expandable to at least about 5 times their initial volume upon heating at a temperature in the range of about 250° F. to about 1100° F. The final product resulting from such heat expansion is a lightweight particulate, said silicate component of which is present in an amorphous phase. The particulate may be used as a filler, insulator or the like. The individual particles are generally spherical, have a generally continuous surface, and possess internally a spumiform structure. The said shape and surface characteristics of these particles cause them to have excellent bulk flow properties, and facilitates their incorporation into mixed component systems.

BRIEF DESCRIPTION OF THE DRAWINGS

The invention is described in detail in connection with the drawings appended hereto, in which.

DETAILED DESCRIPTION

Figure 1:
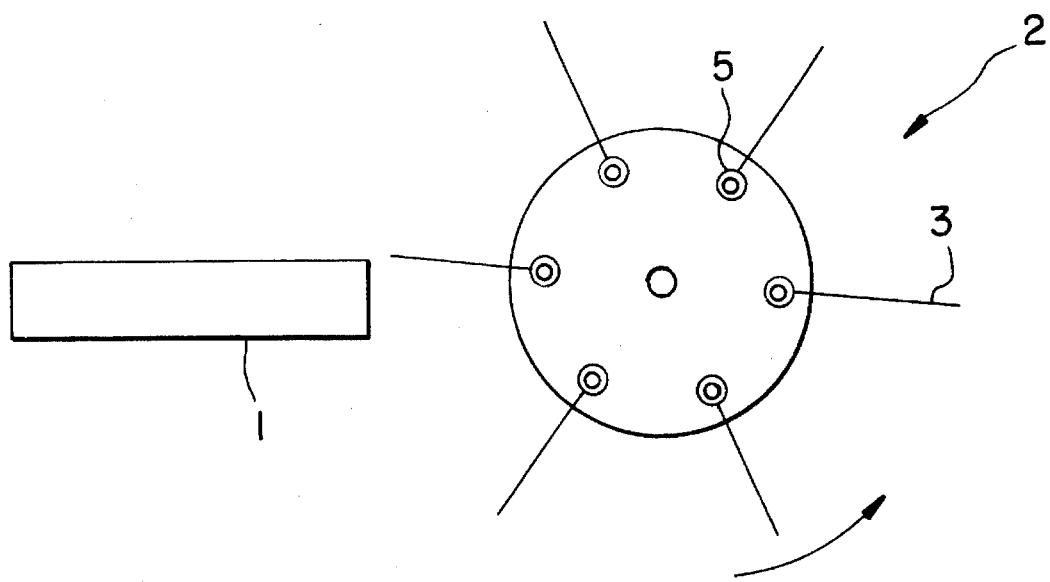
FIG. 1 is a schematic plan view of apparatus for shearing a dilatant gel in the practice of the invention.

The term "spumiform" refers to the frothy or foamy nature of the resulting end product after the intermediate described herein is heated in accordance with the present invention. U.S. Pat. No. 2,117,605 correctly describes a spumiform structure as "a bubbled or intumescent solidified material having a structure similar to that of foam".

The term "dilatant" as used herein to describe the gel which is used to form the intermediate, means that the gel possesses the property of dilatancy. This is the inverse of thixotropy. The flow curve (shear stress vs. shear rate) for dilatant materials is such that apparent viscosity increases with increasing shear rate.

The compositions containing an alkali metal silicate (e.g. sodium silicate) which are contemplated herein in connection with the process of the present invention are those which, when intumesced into spumiform materials, have a relatively high volume expansion ratio of at least about five times. These compositions are comprised of sodium silicate and exhibit some moderate degree of alkalinity, e.g. pH greater than about 8. Completely or almost completely neutralized sodium silicates, such as commercially available silica gels or silica hydrogels, are generally incapable of the expansion ratios which are preferred when the present intermediate compositions are intumesced for end uses.

Compositions employing sodium silicate as a binder which contain less than about 50% sodium silicate on a weight/weight basis are less desirable than those compositions which contain higher levels of sodium silicate.

The final spumiform materials which are produced from the intermediate described herein can be employed as thermal or acoustical insulators, as well as bulking agents which are employed to lower the density of other materials in which they are included, such as concrete, plastics or gypsum. The ability to produce a dense material at a central location, with later on-site expansion to a lightweight end product, is very desirable and cost efficient from a shipping and handling standpoint. The final products have outstanding bulk flow properties and surface characteristics enabling their ready incorporation into mixed component systems— e.g. they are highly effective as fillers in plastics or in other binder systems or matrices. The expanded particles can also be coated with numerous coatings to impart other desired properties. Metalized particles, for example, could be used as electromagnetic insulating material. The particles could also serve as a carrier for various catalysts, yielding high surface areas at low bulk densities.

Particles of a spumiform nature have been made employing soluble sodium silicates of the general formula $Na_2O:xSiO_2$ (weight ratio), where x equals a number between 1 and 7, usually between 2.0 and 3.3. These silicates are normally available in the form of solutions or solids. Normally, the more alkaline silicates are supplied in solutions having a solids content of 44 to 47%. The less alkaline silicates are available with solids contents of approximately 38%, lower solids being useful to increase the stability of the solution. Although potassium silicate rather than sodium silicate may be employed, the sodium silicate is usually cheaper and more readily available and is therefore usually the preferred starting material.

It is also useful to include various compounds along with these silicates to impart various properties to the resultant final spumiform particles. Thus, by adding immediately acting or heat activated insolubilizers in the form of acids or salts, finished particles with greater degrees of insolubility result. More alkaline silicates produce more soluble foams; less alkaline silicates tend to produce less soluble foams. Thus, acidic compounds added to any silicate solution will tend to lower the alkalinity, and thus produce less soluble foams. An example of a preferred insolubilizer for use herein is boric acid.

In addition, inert compounds added to the initial mixture tend to decrease the expansion of the materials, resulting in final spumiform particles of heavier densities. An example of a suitable preferred inert ingredient for use herein is hydrous magnesium silicate.

A method of manufacturing silicate-based compounds is described herein whereby non-caking, easily handled, expandable particles with a silicate content greater than 50% on a weight/weight (w/w) basis of the non-aqueous content can be produced by adjusting the moisture content of the initial mix by diluting or drying to the point where a dilatant gel with very specific properties is formed. The mix can also be prepared by employing a dry alkali metal silicate, provided that the mix contains sufficient water to assure that the silicate is completely dissolved in the gel. In all instances the gel used in practice of the invention includes the alkali metal silicate in a dissolved state. When prepared as described herein, the dilatant gel fractures under shearing forces exceeding the flow response characteristics of the gel, to yield discrete particles. This is a direct result of the dilatancy; i.e. at shear rates below the critical value the dilatant gel will flow in response to same, but as the shear increases a point is reached where the viscosity is so high that the gel can no longer flow and essentially behaves like a solid and fractures in response to the shearing forces.

The dilatant gel, usually having a dissolved solids content of about 38% to 65%, depending upon the formulation, temperature, order of addition, etc., can then be easily formed into discrete particles, which, after a brief conditioning treatment such as exposure to an air stream for a minimum of about one second, while maintaining the particles in a discrete form, can thereafter be easily dried into hard particles of the required size. Further comminution, e.g. by grinding, and/or sizing, can be optionally used to reduce the size of the intermediate particles, which in turn will reduce the size of the expanded particles. This can be of particular interest where the ultimate use is as a filler in plastics or the like.

In the aforesaid conditioning treatment, the particles resulting from fragmentation of the dilatant gel can be allowed, for instance, to fall directly onto a dryer consisting of a rotating or shaking fine mesh screen through which air of a temperature of 100°–210° F. is passed from the bottom to the top of the screen. The screen surface is kept in motion to insure that the newly formed extrusions are separated from each other for a period of about one to five seconds. During this brief period, sufficient conditioning occurs to prevent the individual particles from reagglomerating into undesirable larger masses. It appears that during the conditioning step, a non-tacky skin forms from the material at the surface of the pellets or particles, which skin then prevents reagglomeration or coalescence of the particles with one another.

The conditioned particles are then dried in any suitable dryer, such as a fluid bed dryer, to about a 5 to 40% moisture level, preferably about 20 to about 30% moisture level. The high surface area of the extrusion particles (as compared to a sheet or large chunk of material) allows the necessary drying to occur within a time period as low as about 10 minutes. Where the dilatant gel is extruded and cut as described in our Ser. No. 783,898 application, smooth surfaced, generally rounded particles or pellets result. In a surprising aspect of the invention, it is found that subjecting these particles to a comminution step, even though this may result in more jagged intermediate particles, has little effect on the shape or internal structure of the expanded particles. During subsequent expansion or intumescing, all of these intermediate particles tend to expand uniformly and surprisingly result in intumesced particles of generally spherical nature, which have a generally continuous surface and internally display a spumiform structure. Particles of a more spherical nature tend to flow more readily from a hopper, for instance, since they are less prone to bridging than particles having more angular surfaces. For any given material strength, spherical particles without angular surfaces are also less prone to breakdown and dusting during severe handling. Moreover, they are readily incorporated into mixtures, and provide high bulking properties.

The invention is further illustrated in the following Examples, which are not intended to be delimitive of the invention:

EXAMPLE 1

To 100 parts sodium silicate solution having an $Na_2O:SiO_2$ weight ratio of 1:3.2 and a solids content of 38% (available as N Grade from PQ Corporation, Valley Forge, Pa.) was added 2.0 parts of boric acid and 4 parts of finely divided hydrous magnesium silicate, and the components were mixed until the solids were completely dispersed in the liquid silicate. The mixture was then heated with stirring in an open vessel at a temperature of 180° F. until enough water had been evaporated to yield a moisture content of 52.7%.

The mixture was cooled to a temperature of 80° F. at which point the mixture was in the form of a dilatant, fracturable gel. Employing a screw driven extruder, the gel was forced through a die plate having a multitude of holes each having a diameter of 3/64". As resultant individual continuous extrusions exited the individual holes of the die plate they were broken into individual particles by means of a set of shearing blades which were rotating against, and in contact with the face of the die plate.

The gel particles thus formed were allowed to fall onto a vibrating screen where they were kept in constant motion as separate entities while being simultaneously subjected to a heated air stream (195° F.) for a period of 6 seconds. As a result of this conditioning, a skin was caused to be formed on the gel particles, allowing them to be handled in a fluid bed dryer. These particles were subsequently dried in a fluid bed dryer at 140° F. for 55 minutes, at which time they were found to be hard, free-flowing, non-caking and non-dusting and had a bulk density of 55 lbs./cu. ft.

EXAMPLE 2

Figure 3:
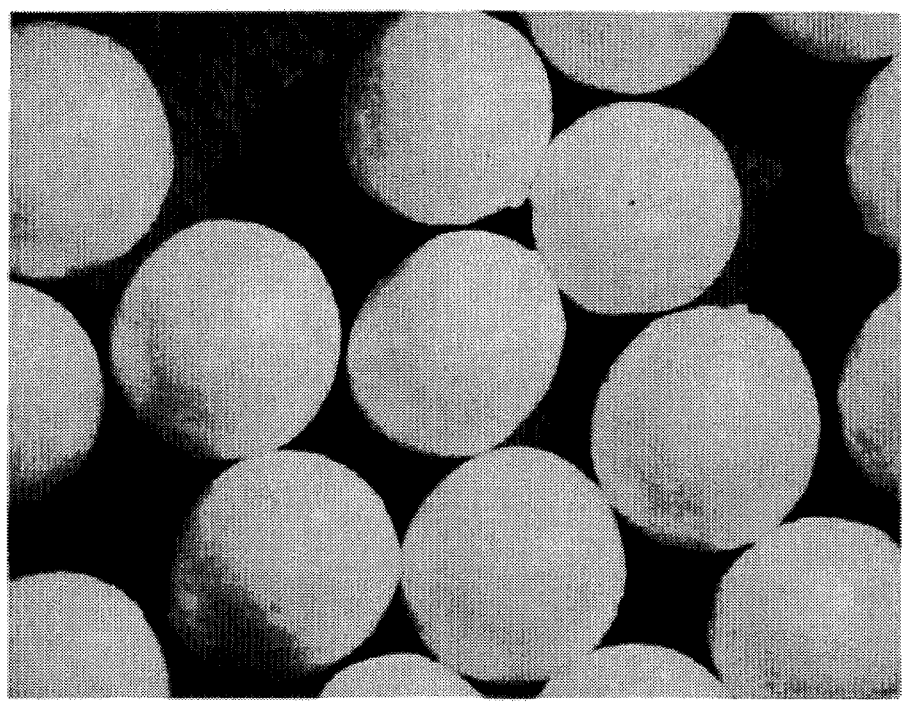
FIG. 3 is a photograph at 12× magnification of a portion of the expanded particulate product of the present invention.
Figure 4:
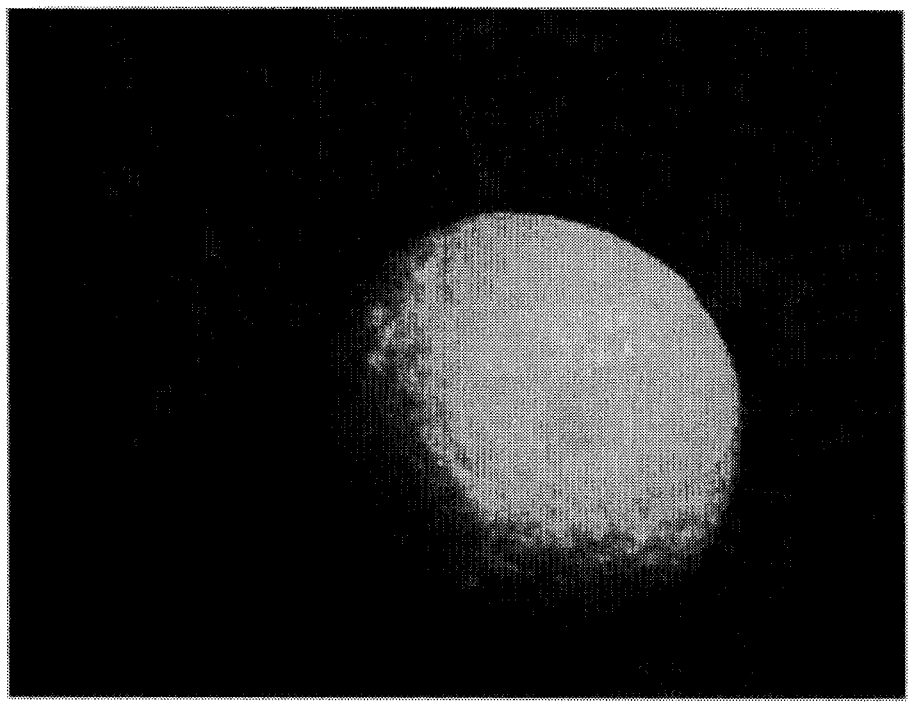
FIG. 4 is a photograph at 20× magnification of a single particle from the particulate in FIG. 3.
Figure 5:
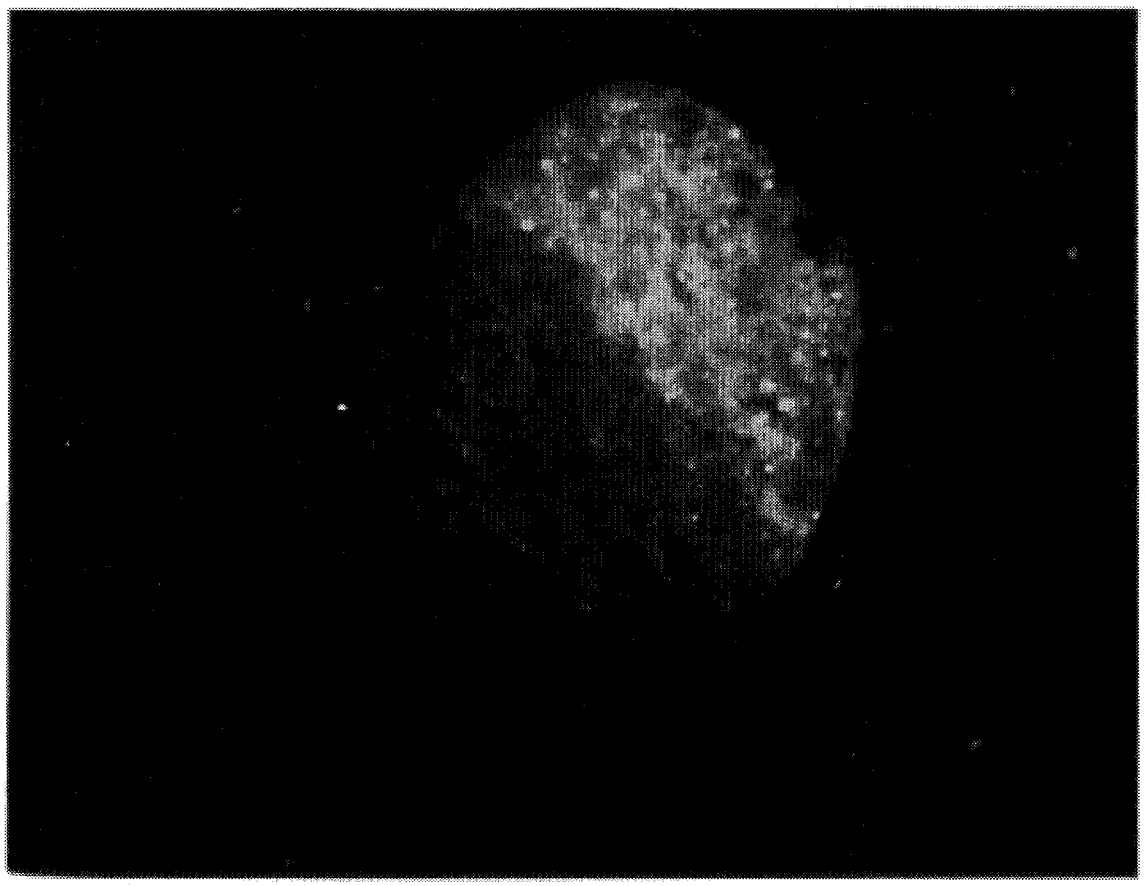
FIG. 5 is a photograph at 20× of a particle as in FIG. 4, which has been sectioned to show the internal spumiform structure.

The intermediate particles of Example 1 were expanded employing a device of the type described in my U.S. Pat. No. 5,160,710 at a temperature of 485° F. and a retention time of 7 seconds. The resulting product is shown in FIGS. 3 through 5. The expanded particles are seen to be generally spherical and possessive of a continuous surface. This explains their outstanding bulk flow characteristics and the ease with which they may be incorporated into mixtures, e.g. into thermoset plastics, gypsum and concrete systems, where they may serve as fillers. At the same time it is seen from FIG. 5 that these particles have a spumiform structure in their interior, which provides strength and light weight. It should be emphasized that the intermediate particles of the invention need not be heat expanded before use. Particularly where incorporated as fillers in extruded, molded, injection molded or thermoformed compositions or the like, the intermediates as produced or in a comminuted form, may be heat expanded in situ, e.g. during the thermoforming or heat curing of a composition in which the intermediate particulate is incorporated, provided that the temperature employed in the process is above about 250° F.

EXAMPLE 3

Figure 2:
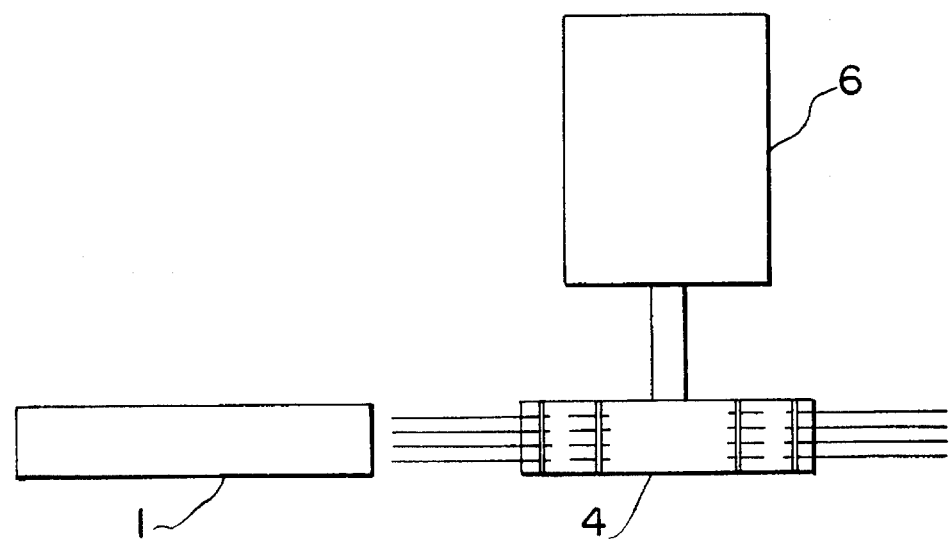
FIG. 2 is a elevational view of the apparatus of FIG. 1.

A high shear force device was constructed as represented by FIGS. 1 and 2. A fixed tube 1 was mounted directly in front of a set of powered flail wires 2. The individual wires 3 were all the same length, and were attached to arbor 4 in such a manner as to allow the individual wires to move or partially rotate around individual wire mounting axles 5 contained in the arbor.

Multiple wires were mounted on each mounting axle. The flail wire assembly was powered directly by electric motor 6 turning at approximately 1000 rpm. The rotation of the flail wire assembly caused the individual wires to position themselves radially to the axis of rotation. The positioning of the feed tube and flail wires was such that the ends of the moving wires described a cylinder, the axis of which was centered on, and perpendicular to the length of the feed tube, the surface of the described cylinder being in very close proximity to, but not in contact with, the feed tube.

A sample of fracturable gel was prepared according to the procedures and methods described in Example 1 above, with the exception that no hydrous magnesium silicate was added. A portion of the fracturable gel was rolled into a cylinder having a diameter slightly smaller than the diameter of the feed tube.

The cylinder of gel was then placed into the open end of the feed tube opposite the rotating flail wires, and pushed into the tube with a wooden dowel such that the gel cylinder was caused to exit from the tube at the flail wire end. Upon exiting the tube, the end of the gel cylinder came in contact with the rotating flail wires, causing small particles of gel to be detached from the gel cylinder.

As material was removed from the end of the gel cylinder by the flail wires, the gel cylinder was caused to advance into the tube by means of the wooden dowel such that the gel was continually being fed into the rotating flail wires. Thus small particles of gel were produced on a continuous basis.

The particles, as they were being continually produced, were allowed to fall directly on to a dryer consisting of a shaking fine mesh screen through which air at a temperature of 150° F. was passed from the bottom to the top of the screen where the particles were allowed to remain as discrete entities for a period of at least 1 second. During this brief period a skin was formed on the particles preventing them from reagglomerating into undesirable larger masses. The particles were then dried in a fluid bed dryer to a moisture level of 28% and remained in a free-flowing state.

When exposed to a temperature in an oven of 600° F. the particles were found to expand approximately 25 times in volume to light, spumiform particles.

The high shear force required to cause the fracturable gel to break into suitable size particles can be applied in any form or manner, as long as the shear force is sufficient to fracture the gel. Because the gel has dilatant rheological properties, force must be applied in a manner and to a degree that prevents the gel from flowing to conform to the force applied.

EXAMPLE 4

A gel prepared as in the prior Example 3 was squeezed through a set of rollers at a low rate of speed. The fracturable gel tended to pass through the rollers in a continuous phase, conforming to the force applied by the rollers. When this same gel was passed through the same set of rollers at a much higher speed, the force applied by the rollers was found to fracture the gel into a discontinuous phase consisting of discrete particles. These particles were conditioned and dried as in Example 3, which resulted in an easily handleable, free-flowing dense particulate, capable of being intumesced into lighter spumiform particulate.

EXAMPLE 5

The required fracturable gel can also be produced directly from a fused mixture of $SiO_2$ and $Na_2CO_3$ by dissolving the glass, under conditions of agitation, heat and optionally pressure, into the proper amount of water to produce a fracturable gel. This gel can be subsequently divided into small particles by application of sufficiently high shear force and by subjecting these resultant particles to an air stream for several seconds while the particles are in motion with relation to each other, and by subsequently drying these particles in a fluid bed dryer to a moisture content of between 5 and 40%, free flowing, easily handleable, dense particles will be produced. These resultant particles are capable of intumescing into lightweight particles of a spumiform nature with the application of sufficient heat to cause intumescence.

Additional components, such as insolubilizers and expansion inhibitors, may be optionally added to, and intimately mixed into the fracturable gel to impart various properties as desired to the final spumiform particles.

When directly dissolving glass, water in excess of the amount needed to form a fracturable gel may be optionally added in the initial step to lower the viscosity of the resultant liquid somewhat to improve handling properties of the liquid, while still retaining a solids content above that of commercially available liquid silicates. This additional water would then be evaporated to produce a fracturable gel, and less total energy would be required than if commercially available liquid silicates with lower solids content were employed.

While certain preferred embodiments of the invention have been described herein in detail, numerous alternative embodiments are contemplated as falling within the scope of the invention. Consequently the scope of the appended claims is not to be limited to the specific examples recited herein.

What is claimed is:

1. A method for producing dense, free-flowing and non-caking alkali metal silicate-based particles which are heat expandable into lightweight particles of a spumiform character, comprising the steps of:

providing a dilatant aqueous gel comprising an alkali metal silicate as the majority non-aqueous component, said silicate being present in said gel in a dissolved state; and the non-aqueous content of said gel being in the range of about 38 to 65% (w/w);

imposing upon said gel shearing forces exceeding the flow response characteristics of the gel, whereby the viscosity of the gel under said shearing forces becomes sufficiently high to cause a discontinuity in the gel, resulting in disruption into discrete particles;

surface conditioning said discrete particles while maintaining said particles as separate entities, to form a skin on the particles so that they will not agglomerate or coalesce with one another; and drying the conditioned particles to form particles having about a 5 to 40% (w/w) moisture level.

2. A method in accordance with claim 1, wherein said conditioning is carried in an airstream.

3. A method in accordance with claim 2, wherein said airstream temperature is in the range of about 100° to 210° F., and the particles are conditioned for at least one second.

4. A method in accordance with claim 1, wherein said shearing forces are applied by advancing a mass of said gel into the path of a plurality of rapidly moving flailing wires.

5. A method in accordance with claim 1, wherein said shearing forces are applied by rapidly squeezing said gel by passage through narrowly spaced counter-rotating rollers.

6. A method in accordance with claim 1, wherein said shearing forces are generated by impacting said gel against a hard surface.

7. A method in accordance with claim 1, wherein said gel is extruded, and said shearing forces are applied to the extrudate to disrupt same.

8. A method in accordance with claim 1, wherein said conditioned and dried particles are comminuted to reduce the particle size.

* * * * *